Feb. 5, 1935.   A. E. LARSEN   1,990,291
AIR ROTOR FOR AIRCRAFT
Filed Dec. 5, 1931   4 Sheets-Sheet 3
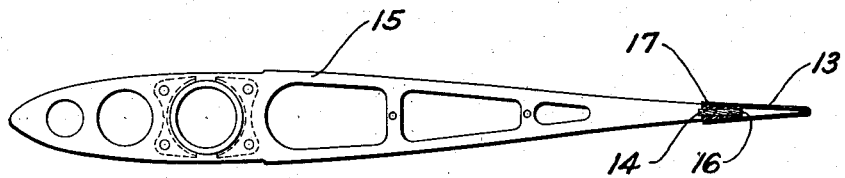
Fig: 4.
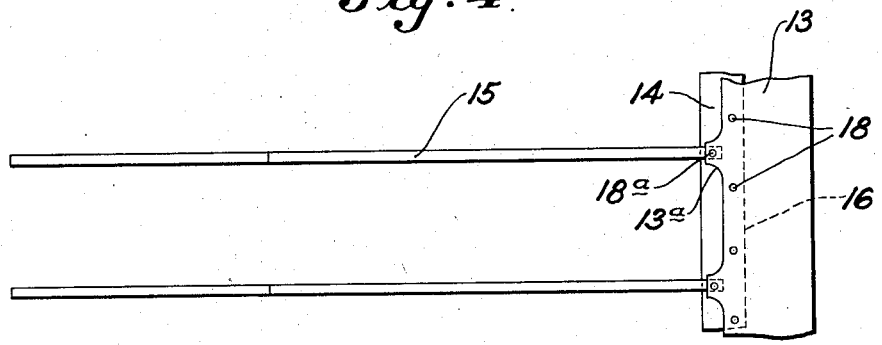
Fig: 5
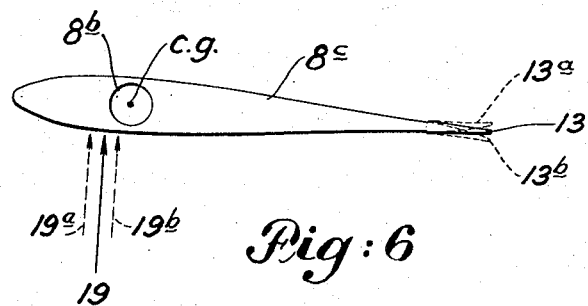
Fig: 6
INVENTOR.
Agnew E. Larsen
BY
ATTORNEYS

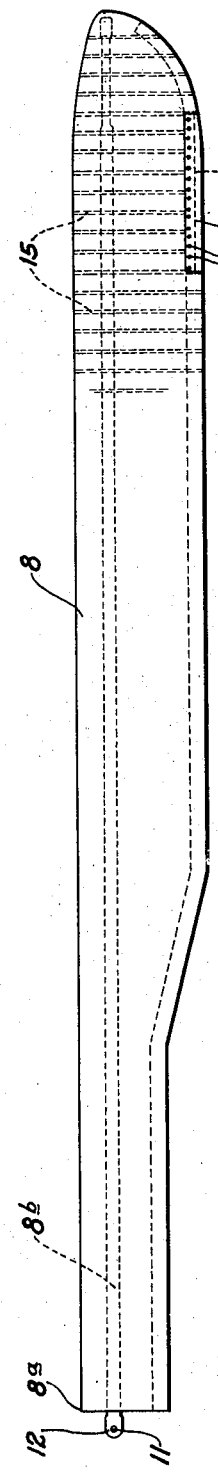
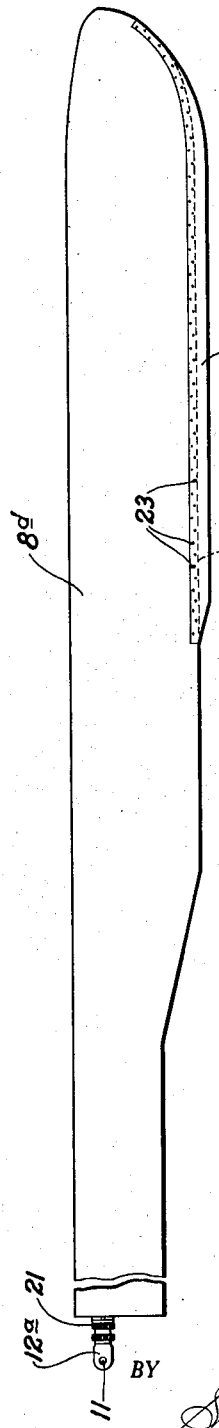

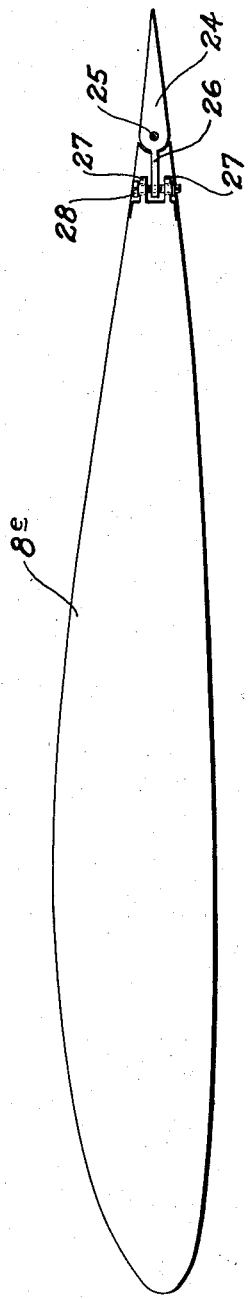
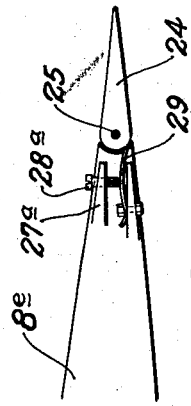
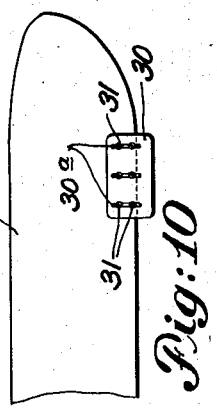
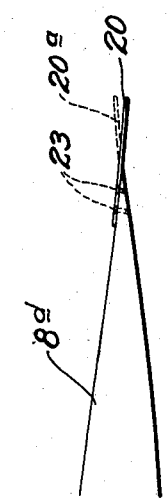

Patented Feb. 5, 1935

1,990,291

UNITED STATES PATENT OFFICE 1,990,291

AIR-ROTOR FOR AIRCRAFT

Agnew E. Larsen, Huntingdon Valley, Pa., assignor to Autogiro Company of America, Philadelphia, Pa., a corporation of Delaware Application December 5, 1931, Serial No. 579,219

11 Claims. (Cl. 244—19)

This invention relates to air-rotors, particularly aerofoil systems normally actuated by relative air flow, and is especially adapted to the rotary wing systems of aircraft; and I herein describe and illustrate the invention as applied to an aircraft having a normally freely wind driven, hinged-wing sustaining rotor and a separate or independent means of forward propulsion.

Broadly, the invention contemplates substantial improvements in the aerodynamic and structural characteristics of such an air-rotor, and particularly of the individual wings or blades thereof, and certain novel methods of adjustment and operation; the simplification of the manufacture, mounting, adjustment, and repair of the rotor blades or wings; the increase of the safety factor in the making of adjustments and in the operation of the machine as a whole; and the considerable reduction of costs of manufacture, assembly, adjustment, inspection and repair.

More particularly, I contemplate the improvement of the structure and of the aerodynamic characteristics of each blade or wing of such a rotary wing system, and thence of the rotor as a whole, the accomplishment of this by a novel form of rotor blade and mounting construction which at the same time reduces the total number of parts necessary and especially of machined parts, the attainment of these purposes by a construction which not only per se improves the aerodynamic action of the rotor blades but also permits of other modifications in the blade and mounting construction which further improve the efficiency of the rotor and of the machine as a whole. The mechanism of the present invention is adapted not only to the improvement and the simplified adjustment of each individual rotor blade but is also adapted to alter, within a given range, certain characteristics of the whole rotor.

Still more specifically, the invention contemplates the attainment of certain objects and advantages similar to those set forth in the copending application of Harold F. Pitcairn, Serial No. 552,298, filed July 22nd, 1931, plus additional objects and advantages not heretofore contemplated or attained. In accordance with said application it will be understood that, in aircraft of the rotative wing type, especially of the type specifically referred to, it has been found desirable to provide means for adjustably setting the individual blades, particularly as to incidence, at least for equalization of the settings of the several individual blades, or to correct for variations or inaccuracies in manufacture as between blades, so that all blades of an assembled rotor may have equivalent aerodynamic characteristics, especially to prevent out-of-track running and to obtain smooth operation of the rotor and thus of the aircraft; also in order that the incidence settings of all of the blades, as a group, may be varied upward or downward to change the general aerodynamic characteristics of the rotor as a whole.

Further, in such aircraft, there is preferably provided for the blades or wings of the rotor a central common axis or hub for all the blades, an individual horizontal pivot axis for each blade, and a vertical pivot axis for each blade, to provide rotational movement, and swinging movement in two general planes for each blade or wing of the system, whereby all of the forces acting on the system, in all styles and attitudes of flight, ranging between full forward flight and vertical descent, may be accommodated and/or compensated for. In addition, in accordance with the said copending application, means of adjustment of each blade about another axis, to wit the longitudinal axis of the blade, is provided, with means for locking the blade in various positions of adjustment on said axis.

The present invention may be used in conjunction with such a construction in its entirety, but I preferably apply my invention in such a way as to make possible the elimination of the means of blade incidence adjustment at the roof or mounting end of the blade, and in so applying the invention I contemplate the extension of the streamline blade surfacing inward toward the root to a point closely adjacent the vertical and horizontal blade articulations. The hub and blade attachment structure is thus reduced in its total outside dimensions, better streamlining is effected, and more efficient operation of the craft is attained.

The foregoing objects and advantages may be accomplished, in accordance with the present invention, by rendering the blade itself, at least in part, adjustable or deformable, or by applying an adjustable or deformable flap, trailing edge, or other element to the blade, preferably adjacent its outer end, or in a zone where the blade action with respect to the air is the most effective.

I further contemplate the convenient application of the invention to existing blades as well as its incorporation in new blades built for the purpose.

Another object of the invention involves the attainment of very fine adjustments of the aerodynamic characteristics of the blade, especially by minute adjustments in its effective incidence (even to small fractions of a degree) without the necessity for equally fine movements or adjustments of the adjusting means itself or the necessity for employing accurate gauges, sights, or other instruments or the necessity of having the work supervised by experts. In fact, a very fine adjustment of the lift, incidence, contour, tracking, and operation in general, of any given blade, may be made by a relatively coarse adjustment of a small part of the trailing edge adjacent the tip thereof, for example, by an ordinary mechanic, using a screw driver or a pair of pliers, and this without the necessity for dismantling the rotor or the blades, or returning the machine or any part of it to the factory.

Still another object of the invention is to alter the blade contour, or effective incidence, at least of a portion of the blade, in such a manner as to alter the center of pressure, particularly with respect to its center of gravity, either at a given section of the blade, or along a considerable portion of its length; and specifically, I contemplate the carrying out of the invention in a blade such as disclosed and claimed in the copending application of Juan de la Cierva, Serial No. 532,603, filed April 24th, 1931, in which the normal center of pressure, at a given section of the blade, is somewhat ahead of the center of gravity at that section.

The foregoing, together with other objects and advantages which may be incident to the invention or which may occur to those skilled in the art, may be attained by the forms of construction and the methods of procedure hereinafter described, and illustrated in the accompanying drawings.

Figure 1 of the drawings is a side elevational view of an aircraft, in full forward flight, provided with a rotor construction embodying the present invention, and illustrating a method of adjusting the blades or wings in accordance with the invention;

Figure 2 is an enlarged plan view of one of the wings or blades of the rotor of Figure 1, illustrating one form of construction in accordance with this invention;

Figure 3 is a plan view similar to Figure 2, illustrating a modified construction employed in carrying out the invention;

Figure 4 is a further enlarged elevational view of a blade rib such as employed in the wings of Figures 2 and 3, showing in section the trailing edge strip or stringer of the blade and one form of the trailing edge of the present invention mounted on said rib and strip;

Figure 5 is a plan view of a structure similar to that of Figure 4, showing a pair of ribs and the application of an improved trailing edge element to said ribs and to the strip;

Figure 6 is a diagrammatic view, illustrating a blade section at a given incidence and further showing, on an exaggerated scale, the shift in normal center of pressure on the section accomplished by the deforming or warping of the trailing edge;

Figure 7 is an enlarged view, somewhat similar to Figure 6, of a blade of different contour and illustrating a modified form of the invention, in which the trailing edge is pivoted on the blade;

Figure 8 is a fragmentary view of a construction similar to Figure 7, but illustrating a modified form of adjustment for the pivoted trailing edge;

Figure 9 is a similar fragmentary view, illustrating a very simple application of the invention to an existing blade, without modification of the blade structure itself; and Figure 10 is a fragmentary view illustrating still another modification of the invention, in which the trailing edge is shiftable, instead of deformable, with respect to the major portion of the blade surface.

Figure 1:
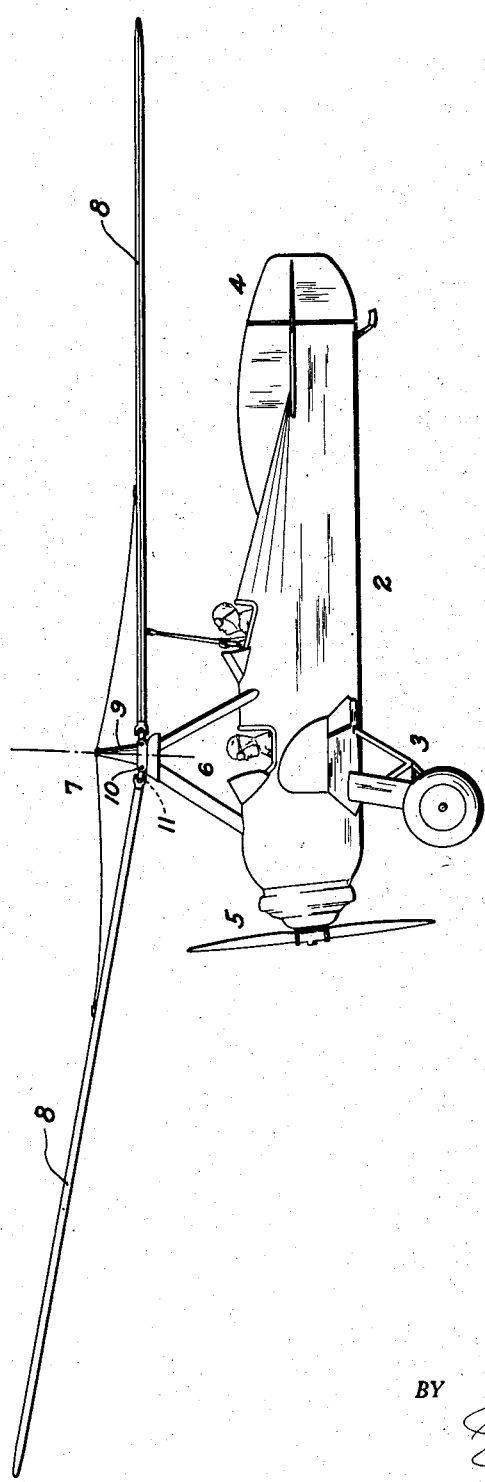

By reference to Figure 1 it will be seen that I have illustrated an aircraft 2, with landing gear 3, empennage 4 and means of forward propulsion 5. Above the forward cockpit is arranged a pylon 6 for mounting the air-rotor 7 of the present invention, said rotor being actuable by relative air flow, so as to sustain the craft in forward flight and allow it to settle gently in vertical descent. Each blade or wing 8 of the rotor is individually pivoted to the common rotative hub 9, by means of horizontal and vertical articulations 10 and 11. As shown, a blade which is at any given moment, during forward flight, in the forward part of its rotative path rides higher than that blade which is at the same moment in the rear part of the rotative path, and in fact, as is now known, each blade during each complete revolution swings upwardly and downwardly, independently of the positions of the other blades of the rotor, and also forwardly and rearwardly on its vertical pin, to accommodate variations in forces of lift, inertia, etc.

For smooth rotor operation, for greatest efficiency, for minimum vibration, and for the best equilibrium and the most desirable conditions generally, the structural and aerodynamic characteristics and the individual effective blade incidence setting should be exactly uniform for all the blades of the rotor. With such uniformity (assuming no irregular gusts of wind), each blade or wing would pass a given point in the rotative path at exactly the same position as would every other blade of the rotor. However, it can readily be seen that in a rotor of this character, in which each wing, for example, may be as much as twenty or more feet in length, variations are practically certain to occur, such as imperfections in aerofoil contour, slight inaccuracies of incidence in certain sections of a blade in assembling, minor differences in weight or location of center of gravity, minute variations in structural parts causing differences in flexibility in various portions of the blade or in different blades, slight inaccuracies in alignment of blade articulations, minor variations in average effective pitch setting of the blades, and the like. All of these elements, and perhaps others, interfere with the smoothest operation of the rotor, result in one or more of the blades taking more than their share of the load, and reduce the efficiency of the wing system. To correct for them by change in the pitch setting at the root involves incidence adjustment mechanism of fine workmanship and expensive construction, and the adjustment involves the exercise of considerable skill and accurate tools or instruments. Furthermore, if even one blade be damaged, the substitution of a new blade is apt to necessitate the re-adjustment of all of the blades of the rotor. In addition, very fine adjustments, even as fine as two or three minutes in angular measurement at the blade root may be needed, and these are difficult to make and to maintain.

In accordance with the present invention, for a given type of machine, a rotor hub may be built with a predetermined relation between the horizontal and vertical pivots for each blade and between said pivots and the common central axis, and the blade terminal fitting may be so mounted upon the blade spar, or the blade itself so mounted upon the spar, that the desired average incidence setting for the blade, as predetermined, may be built to a fixed degree with respect to the blade articulation pivots. For example, in accordance with the teaching of the copending application of Juan de la Cierva, Serial No. 500,064, filed December 4th, 1930, the blade or wing may be so set on its spar, or the spar may be so set with respect to its articulated terminal that a fixed positive lift incidence of, for example, 2° as compared with a no-lift setting related to a plane perpendicular to the axis of rotation, might be had. If, in addition, the blade be constructed to be slightly torsionally flexible, under load, for example to give 2° twist in flight, between the root and the tip, the average effective blade incidence in flight would approximate roughly 3°.

Such a blade (not limited to any particular pitch setting, however) is illustrated in Figure 2, in which I extend the blade covering at 8a radially inward, substantially to the terminal fitting 12 which receives the vertical pivot pin 11. The spar 8b of the blade is thus streamlined practically all the way in to the hub. Variation in the average effective incidence, for any of the purposes hereinbefore described, may be attained by the bendable or deformable element 13, mounted with its rear edge flush with the trailing edge of the blade. Such element may take the form of a V-shaped metallic strip such as aluminum, which can be readily bent up or down but which will take a "set", or retain its shape as against any air pressure encountered.

The adjustable trailing edge 13, as also shown in more detail in Figures 4 and 5, may be mounted with one leg of the V overlapping and with the other leg underlapping the trailing portion of the blade. The usual trailing edge strip 14 which is fitted into the rear ends of the ribs 15, may be cut back, that is narrowed, as indicated at 16, so that the portion of the deformable element 13 along the trailing edge 14 may be warped or bent. The ribs, also, in that portion of the blade where the trailing edge element 13 is attached, may be cut off a little shorter than usual, for the same purpose. Wedge-like filler elements 17 are preferably inserted between the ribs and overlying and underlying the trailing edge stringer 14, so as to provide a good foundation for the attaching rivets 18. As shown in Figure 5, the trailing edge element 13 may also have forward extensions 13a to be riveted, as at 18a, to the rear ends of the ribs.

The structural features shown in Figures 2, 4 and 5 may readily be built into the blades when constructed, although they are also well adapted for application to blades already in service, as by cutting back the trailing edge stringer as above described. Before proceeding with a description of the other forms of structure shown, it will be in order to explain the use and operation of the device just described with reference to Figures 2, 4 and 5.

By reference again to Figure 1, it will be seen that while the pilot, seated in the front cockpit, is handling the machine (and for test purposes the flight should be conducted in quiet air), his assistant, who sits in the rear cockpit, tests the blades for tracking. For test purposes, the attendant is provided with a stick, carrying at its upper end a small brush or dauber on which some grease or the like may be placed. The stick is gradually moved upwardly until the dauber just makes contact with the under surface of the wings, as they rotate under the action of relative air flow. Upon descent, the blades are examined, and differences in the amount of grease or the extent of the grease streak on the surfaces of the blades are noted. Those blades which bear a heavier mark, or a streak which is longer (considered transversely of the blade) are riding low, while the other blades are riding high and taking more than their share of the load.

By reference to Figure 6, assuming the center of gravity of a given section of the blade to lie at the point cg, centrally of the blade spar 8b, and further assuming that the normal center of pressure is at the point indicated by the arrow 19, it will be seen that the center of pressure of the particular blade section with respect to the center of gravity may be altered by altering the blade contour. In fixed wing aircraft, it is a universal custom to lower the aileron of a given wing in order to raise that wing. In the construction just described, if the wing 8c is tracking too low, the trailing edge 13, instead of being lowered, as in fixed wing practice, will be raised as indicated in dot and dash lines at 13a. This causes a shift in the center of pressure forwardly, which is indicated in exaggerated form by the shift of the arrow 19 to the position 19a, resulting in increased torsional deformation of the wing, producing a greater effective pitch, and causing the blade thereafter to ride higher than it originally did.

Conversely, if the blade 8c is a blade which was found by test to be riding too high in its rotation, the trailing edge is bent downward to the position 13b, which moves the center of pressure rearwardly as indicated at 19b, lessening the torsional deformation of the blade, and thus lessening its effective incidence in flight and causing it to ride lower.

For most purposes, and especially in a blade of the character just described, only a small area or extent of the trailing edge need be warped; for example, a length covering approximately eight spaces between ribs, in the outer zone of the wing. Since the outer portion of the wing is moving with a greater velocity relative to the air than other portions of the wing, the mounting of my warping mechanism adjacent the tip is highly effective, and in fact, the resulting shift in the center of pressure upon the outer portion of the blade will produce a graduated change in deformation of the entire blade from tip to root, in flight; and for most practical purposes it will be unnecessary to provide the expensive and somewhat bulky incidence adjustment device, with its attendant difficulty in delicate adjustment, adjacent the blade root. In some cases, however, a wider range of adjustment may be desired, for example in order to alter the characteristics of the rotor as a whole, as by substantially changing the effective incidence of all the blades. Likewise, if the blade is less flexible torsionally, or if the center of pressure lies nearer to the center of gravity of the blade section, it may be desirable to provide a greater deformable area. In Figure 3, I illustrate such a blade 8d, in which the deformable trailing edge 20 extends along a larger portion of the wing or blade; and I may combine this construction with a blade terminal fitting 12a having a mechanical pitch changing device 21 at the root end of the blade spar, as shown. The construction illustrated in Figure 3 further shows clearly how my improvement may be applied to a blade already in service, with no change whatever in the blade construction itself. The dotted line 22 indicates the trailing edge of the blade as built, the element 20 being a single flat plate, secured to the trailing edge stringer as by rivets 23. A detail of this construction is illustrated also in Figure 9, which shows the deformable trailing edge 20 as being applied on the upper side of the blade, although it could equally well be applied on the under side.

By reference to Figure 7, it will be seen that the adjustment device for the blade 8e takes the form of a flap member 24 pivoted at 25 at the rear or trailing edge of the blade. This member 24 may be made in several sections if desired, each of which is provided with an arm 26 fitted in the space between fixed ears or lugs 27. A screw 28, held as against longitudinal movement, by the ears 27, is in threaded engagement with the arm 26, so that by turning the screw with a screw driver the adjustment of the trailing edge may be easily effected. This form of construction has the advantages of substantially uninterrupted blade contour, and substantially no external protuberances.

In Figure 8, the element 24 is pivoted at 25, but the adjustment may be simplified by employing a screw 28a threaded in one ear 27a and abutting against a curved spring member 29.

In the construction shown in Figure 10, the desired effect is produced by a trailing edge strip 30, which may lie flat against and slide on the upper surface of the blade 8f. Elongated holes or slots 30a are provided in the strip 30, through which the tightening screws 31 pass. By loosening these screws, the strip may be moved slightly forwardly or rearwardly on the blade, after which it may be tightened in place.

The mechanism for carrying out the invention may, of course, take other forms, but the forms of construction I have shown are simple and effective, and I have found that the tests and any necessary adjustments are very easily made, at the field of operations, and without dismantling the rotor or its blades. Very fine blade adjustments, as to tracking, etc., may be obtained, without the use of levels, protractors, and the like, and without exercising any great degree of accuracy in the bending of the trailing edge.

What I claim is:—

1. For an aircraft, an elongated rotative wing having a portion of its effective surface shiftable transversely of its longitudinal axis.

2. For an aircraft, a sustaining rotor including a wing positioned to be rotated under the action of relative air flow, a normally freely rotative axis member for the wing, and means for adjustably setting at least a portion of the wing to different contours, said last means including a semi-stiff, bendable trailing edge portion.

3. For an aircraft, a sustaining rotor including a wing positioned to be rotated under the action of relative air flow, a normally freely rotative axis member for the wing, and means for adjustably setting at least a portion of the wing to different contours, said last means including a slidably adjustable trailing edge portion.

4. In an aircraft, a rotatable sustaining wing or blade, pivot means whereby the blade may take an irregular rotative path, and means for altering the path of movement which the blade will take during rotation, said means including a blade-surface-contour element bendable to different positions and composed of a material adapted to take a set.

5. The method of adjusting individually-freely-pivoted wings or blades of an autorotative air-rotor which includes setting up rotation of the rotor to substantially its normal autorotational speed, contacting a marker with the blades as they rotate, and ascertaining irregular aerodynamic tracking of the blades, as occurs in their free pivotation, by variations in the markings on the blades, and adjusting blade incidence to substantially equalize the aerodynamic tracking of the blades, by shifting a trailing edge portion of the blade in a direction toward one side or the other of the rotary path of movement thereof, the general direction of shifting being the same as the general direction in which it is desired the blade shall be shifted in its operation.

6. The method of correcting an out-of-track blade of a pivoted-blade air-rotor which includes shifting a trailing edge portion of the blade in a direction toward one side or the other of the rotary path of movement thereof, the general direction of shifting being the same as the general direction in which it is desired the blade shall be shifted in its operation.

7. In an aircraft, means of sustension including a rotative wing system comprising a central hub member and wings positioned to be normally autorotated thereabout by the relative airflow during flight, each wing of the system being torsionally flexible and pivoted to the central hub member for up and down movement, and means for adjusting the individual wings so that all will assume substantially the same relative path of travel with respect to the hub during flight, said means including an adjustable portion at the trailing edge of the wing which when adjusted downwardly below the plane of the wing causes the center of pressure of the wing to be moved rearwardly, thus reducing the effective incidence of the wing by torsional deflection, whereby to cause a reduction in lift of the wing.

8. In an aircraft, means of sustension including a rotative wing system comprising a central hub member and wings positioned to be normally autorotated thereabout by the relative airflow during flight, each wing of the system being torsionally flexible and pivoted to the central hub member for up and down movement, and means for adjusting the individual wings so that all will assume substantially the same relative path of travel with respect to the hub during flight, said means including an adjustable portion at the trailing edge of the wing which when adjusted downwardly below the plane of the wing causes the center of pressure of the wing to be moved rearwardly, thus reducing the effective incidence of the wing by torsional deflection, whereby to cause a reduction in lift of the wing, said adjustable portion being constructed to maintain a substantially fixed adjustment setting during flight.

9. In an aircraft, means of sustension including a rotative wing system comprising a central hub member and wings positioned to be normally autorotated thereabout by the relative airflow during flight, each wing of the system being torsionally flexible and pivoted to the central hub member for up and down movement, and means for adjusting the individual wings so that all will assume substantially the same relative path of travel with respect to the hub during flight, said means including an adjustable portion at the trailing edge of the wing which when adjusted downwardly below the plane of the wing causes the center of pressure of the wing to be moved rearwardly, thus reducing the effective incidence of the wing by torsional deflection, whereby to cause a reduction in lift of the wing, said adjustable portion extending in a zone near the tip of the wing, and, in its various positions of adjustment lying within the normal outline of the wing, viewed in plan.

10. For an aircraft, a sustaining wing having means for mounting it at one end in position to be normally autorotated about said mounting by the relative air-flow in flight with capability for up and down movement under the influence of flight forces, said wing having a body structure centrifugally supported or carried by the mounting and formed to an aerofoil shape having its sectional center of pressure, in a portion near the tip, normally located near the center of gravity of the structure in that portion, the aerofoil structure of the wing including surfacing adjustable transversely of the general plane of the wing through such a range in a downward transverse direction as to effect a rearward movement of the center of pressure and thus a reduction of the incidence of the wing by torsional deformation of the structure thereof whereby the wing takes a lower position, in its rotative path of travel, upon such adjustment.

11. For an aircraft, a sustaining wing having means for mounting it at one end in position to be normally autorotated about said mounting by the relative air-flow in flight with capability for up and down movement under the influence of flight forces, said wing having a body structure centrifugally supported or carried by the mounting and formed to an aerofoil shape having its sectional center of pressure in a portion near the tip normally located near the center of gravity and center of support of the section at said portion, the aerofoil structure of the wing including surfacing adjustable transversely of the general plane of the wing through such a range in an upward transverse direction as to shift said center of pressure in a forward direction with respect to said center of gravity and support to a point such that the incidence of the wing is increased by torsional deformation under flight load whereby the wing takes a higher position, in its rotative path of travel, upon such adjustment.

AGNEW E. LARSEN.